United States Patent
Visser et al.

(10) Patent No.: US 9,831,789 B2
(45) Date of Patent: Nov. 28, 2017

(54) SWITCHED MODE DRIVE CIRCUIT (71) Applicant: NORTH-WEST UNIVERSITY, Potchefstroom (ZA)

(72) Inventors: Barend Visser, Potchefstroom (ZA); Petrus Paulus Krüger, Potchefstroom (ZA)

(73) Assignee: NORTH-WEST UNIVERSITY, Potchefstroom (ZA)

( * ) Notice: Subject to any disclaimer, the term of this patent is extended or adjusted under 35 U.S.C. 154(b) by 0 days.

(21) Appl. No.: 14/769,960

(22) PCT Filed: Feb. 25, 2013

(86) PCT No.: PCT/IB2013/051501
§ 371 (c)(1),
(2) Date: Aug. 24, 2015

(87) PCT Pub. No.: WO2014/128533
PCT Pub. Date: Aug. 28, 2014

(65) Prior Publication Data
US 2016/0006355 A1    Jan. 7, 2016

(51) Int. Cl.
*H02M 3/337* (2006.01)
*H01F 27/38* (2006.01)
*H02M 3/338* (2006.01)

(52) U.S. Cl.
CPC ............ *H02M 3/337* (2013.01); *H01F 27/38* (2013.01); *H02M 3/338* (2013.01)

(58) Field of Classification Search
CPC ...... H02M 3/28; H02M 3/337; H02M 3/3372; H02M 3/3376; H02M 3/3378; H02M 3/33569; H02M 7/53806; Y02B 70/1433
See application file for complete search history.

(56) References Cited

U.S. PATENT DOCUMENTS 5,548,503 A    8/1996  Motonobu et al.
6,731,524 B2 * 5/2004  Elek .................. H02M 1/34
                                        323/207
(Continued)

FOREIGN PATENT DOCUMENTS

EP    1 508 956 A2    2/2005
JP    H7-67332 A      3/1995
(Continued)

OTHER PUBLICATIONS

Salmon et al., "PWM Inverters Using Split-Wound Coupled Inductors," IEEE Transactions on Industry Applications, vol. 45, No. 6, Nov./Dec. 2009, pp. 2001-2009.*

*Primary Examiner* — Nguyen Tran
*Assistant Examiner* — Monica Mata
(74) *Attorney, Agent, or Firm* — Blank Rome LLP (57) ABSTRACT A switched mode drive circuit 10 comprises a first switch 14 having a first terminal 14.1 and a second terminal 14.2, a second switch 16 having a first terminal 16.1 and a second terminal 16.2, an inductive component 20 comprising at least a first winding part 20.1 having a first end 20.1.1 and a second end 20.1.2 and a second winding part 20.2 having a first end 20.2.1 and a second end 20.2.2 and an energy storage device 18 having a first pole 18.1 and a second pole 18.2. The first and second terminals of each of the first and second switches and the first and second ends of each of the first and second winding parts are connected in series over the first and second poles of the energy storage device and the first and second winding parts are configured in one of a common mode and a differential mode.

16 Claims, 11 Drawing Sheets (56) References Cited

U.S. PATENT DOCUMENTS

| 7,317,305 B1 | 1/2008 | Stratakos et al. |
| 2005/0146310 A1 | 7/2005 | Orr |
| 2012/0147494 A1 | 6/2012 | Sase et al. |

FOREIGN PATENT DOCUMENTS

| JP | H10-98873 A | 4/1998 |
| JP | 2000-299990 A | 10/2000 |

* cited by examiner

SWITCHED MODE DRIVE CIRCUIT

INTRODUCTION AND BACKGROUND

This invention relates to a switched mode drive circuit and method for an inductive component. The invention more particularly, but not exclusively, relates to buck, boost and push-pull drive circuits.

Drive circuits comprising a first switch having first and second terminals, a second switch having first and second terminals and wherein a terminal of the first switch, a terminal of the second switch and one end of an inductive component to be driven are connected to one another at a common node are known in the art. In push-pull configurations, transistors are used as the first and second switches and in buck, boost and buck-boost configurations, a diode is used as one of the switches.

In all these configurations, an energy storage device is connected over the terminals of the first and second switches that are not connected to the common node. In push-pull and buck configurations, the energy storage device comprises a DC power supply. In a boost configuration the energy storage device comprises an output capacitor and in a buck-boost configuration, the energy storage device may comprise a DC power supply and an output capacitor connected in series.

During normal operation, the switches are driven to be on and off in alternating relationship—that is when the first switch is on, the second switch is off, and vice versa. However, it is well known that it may happen that both the first and second switches are on at the same time, so that the energy storage device is short-circuited. This may result in large currents which may cause damage, such as damage to the switches.

Conventional protection circuits and methods are aimed at ensuring that the one switch is fully off, before the other switch is switched on. In push-pull configurations this may be achieved by inserting some delay between the switching off of the one transistor and before the other transistor is switched on. In buck and boost configurations a fast switching diode is normally used. In other embodiments a conventional series protection inductor comprising a magnetic core is used. As will be clear and will be described in more detail below with reference to FIG. 1, these techniques limit not only the maximum frequency of the drive circuit, but also the efficiency of the drive circuit.

OBJECT OF THE INVENTION

Accordingly, it is an object of the present invention to provide an alternative drive circuit and method with which the applicant believes the aforementioned disadvantages may at least be alleviated or which may provide a useful alternative for the known circuits and methods.

SUMMARY OF THE INVENTION

According to the invention there is provided a switched mode drive circuit comprising:
  a first switch comprising a first terminal and a second terminal;
  a second switch comprising a first terminal and a second terminal;
  an inductive component comprising at least a first winding part having a first end and a second end and a second winding part having a first end and a second end; and an energy storage device having a first pole and a second pole, wherein
    the first and second terminals of each of the first and second switches and the first and second ends of each of the first and second winding parts are connected in series over the first and second poles of the energy storage device; and
    the first and second winding parts are configured in one of a common mode and a differential mode.

The first end of the first winding part may be connected to the second terminal of the first switch, the second end of the first winding part may be connected to the second end of the second winding part and the first end of the second winding part may be connected to the first terminal of the second switch.

The first winding part and second winding part may be arranged in one of at least partial bifilar configuration, hybrid configuration and a co-wound configuration.

At least one of the first switch and the second switch may comprise a switching transistor. In some embodiments each of the first switch and the second switch comprises a switching transistor. In other embodiments at least one of the first switch and the second switch comprises a diode.

The first terminal of the first switch may be connected to the first pole of the energy storage device and the second pole of the second switch may be connected to the second pole of the energy storage device. The energy storage device may comprise a DC power supply.

In other embodiments the energy storage device comprises a capacitor.

An impedance component, preferable a resistive component may be provided between the second terminal of the first switch and the first terminal of the second switch in parallel with the first winding part and the second winding part.

The circuit may comprise a damping component between at least one of a) the first pole of the energy storage means and the first terminal of the second switch and b) the second pole of the energy storage means and the second terminal of the first switch.

The first and second winding parts may be configured in common mode and the inductive component may comprise a primary winding of a transformer.

In other embodiments the inductive component comprises a protection winding with an intermediate tap between the first winding part and the second winding part which are configured in a differential mode.

The intermediate tap may be connected to an inductive component to be driven and said component may comprise a primary winding of a transformer to be driven.

Also included within the scope of the invention is a method of driving first and second switches in an alternate switched mode, the method comprising the step of causing a winding comprising a first winding part and a second winding part to be used in series between the first and second switches; and causing the first and second winding parts to be configured in one of a common mode and a differential mode.

BRIEF DESCRIPTION OF THE ACCOMPANYING DIAGRAMS

The invention will now further be described, by way of example only, with reference to the accompanying diagrams wherein:

FIGS. 2(*a*) to (*c*) are oscillographs of signals at selected points in the diagram in FIG. 1;

FIGS. 5(*a*) to (*c*) are oscillographs of signals at selected points in the diagram in FIG. 4;

FIGS. 13(*a*) to 13(*d*) are diagrammatic representations of example embodiments of winding configurations.

DESCRIPTION OF A PREFERRED EMBODIMENT OF THE INVENTION

Figure 1:
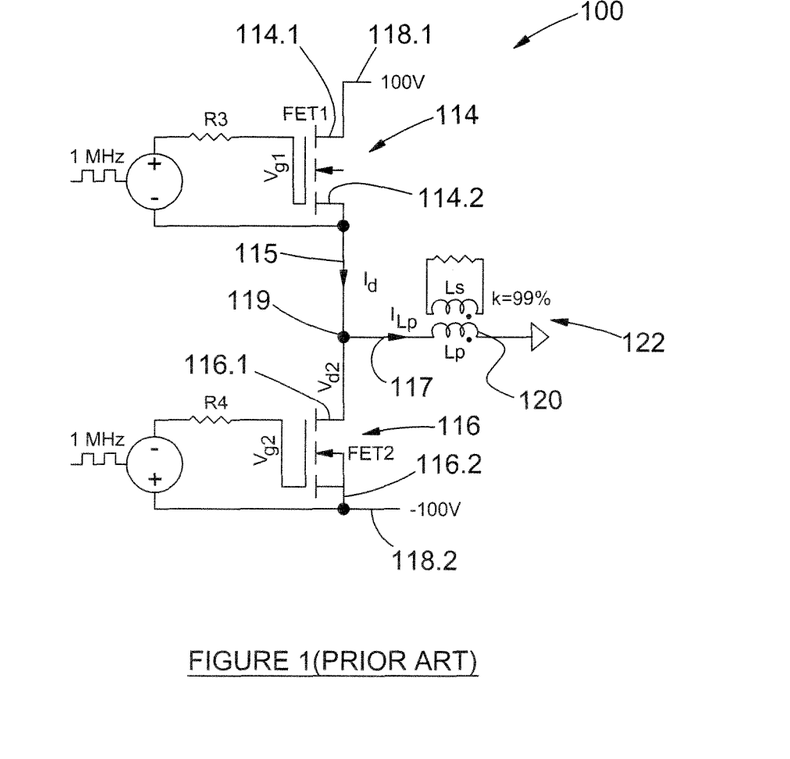
FIG. 1 is a basic circuit diagram of a prior art switched mode drive circuit comprising first and second transistors operated in a push-pull mode to drive a primary winding of a transformer.

An output stage of a prior art switched mode drive circuit is generally designated by the reference numeral 100 in FIG. 1.

This known output stage comprises a first insulated gate semiconductor switch device 114 and a second insulated gate semiconductor switch device 116. The first and second devices are connected in series in a circuit 115 between the poles 118.1 and 118.2 of a DC power supply with the source 114.2 of the first device 114 connected directly to the drain 116.1 of the second device. A branch circuit 117 comprising a primary winding 120 of a transformer 122 to be driven is connected at common node 119 to the source 114.2 of the first switch device and the drain 116.1 of the second switch device.

Figure 2A:
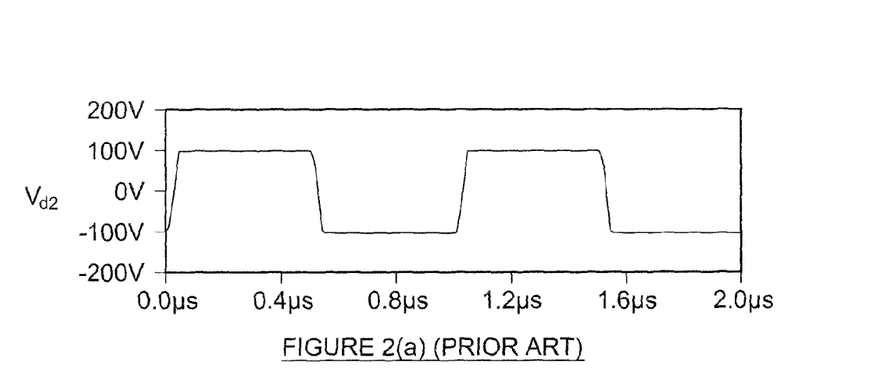
Figure 2B:
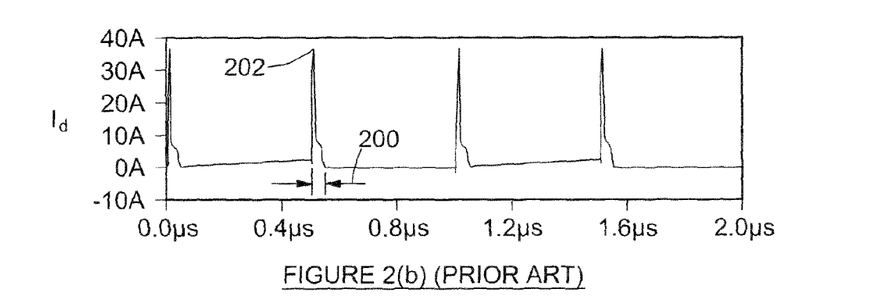
Figure 2C:
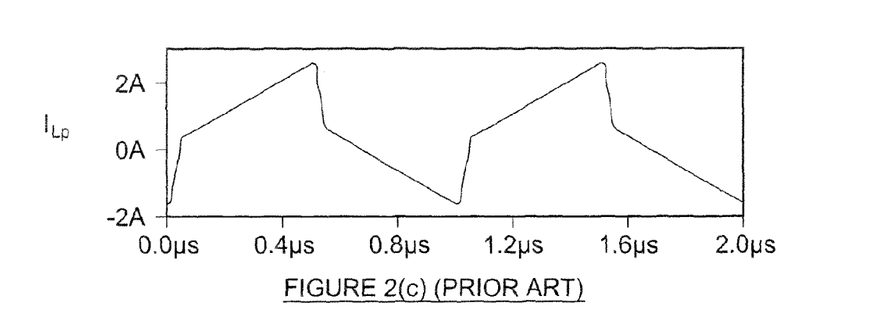

In FIG. 2, oscillograms against time of signals at selected points in FIG. 1 are shown. FIG. 2(*a*) depicts the voltage at point 116.1. FIG. 2(*b*) shows the current in the circuit 115 and through the devices 114 and 116. FIG. 2(*c*) shows the current in branch 117 and through the primary winding 120. During normal operation, one of the switch devices is on while the other is off. This forms a circuit between the DC power supply, the switch that is on and the primary winding 120 of the transformer 122. This circuit is referred to as the primary circuit. For good performance, the power supply and switches have as small as possible impedance. The voltage across the primary winding 120 is then approximately the supply voltage, as shown in FIG. 2(*a*).

However, FIG. 2(*b*) illustrates that for short periods 200, both switch devices 114 and 116 are on at the same time. When both switch devices are on, a shorted circuit is formed between the DC power supply and the two serially connected switches 114 and 116. Because of the aforementioned low impedance of the DC power supply and the switch devices and as stated in the introduction of the specification, during these periods 200, the current in the shorted circuit increases very fast. As shown in FIG. 2(*b*) during these periods 200, the current in the shorted circuit may reach values in excess of 30A, which may cause damage to one or both of the switch devices. Should a conventional series protective inductance or resistance be added to the shorted circuit in the conventional manner, this inductance and impedance would also be added to the primary circuit, which would degrade the performance of the switched mode drive circuit and which is of course undesirable. More particularly, since the periods 200 during which both switch devices are on is much shorter than the period during which only one of the switch devices is on, the frequencies at which protection is required are larger than the frequency at which the drive circuit is operating. It is known that inductive components having a magnetic core are normally frequency dependent, such that the inductance is lower at higher frequencies than at lower frequencies. Hence, by adding conventional series protection inductor to the shorted circuit would result in more inductance being added at the lower frequency of the primary circuit, which is undesirable.

Figure 3:
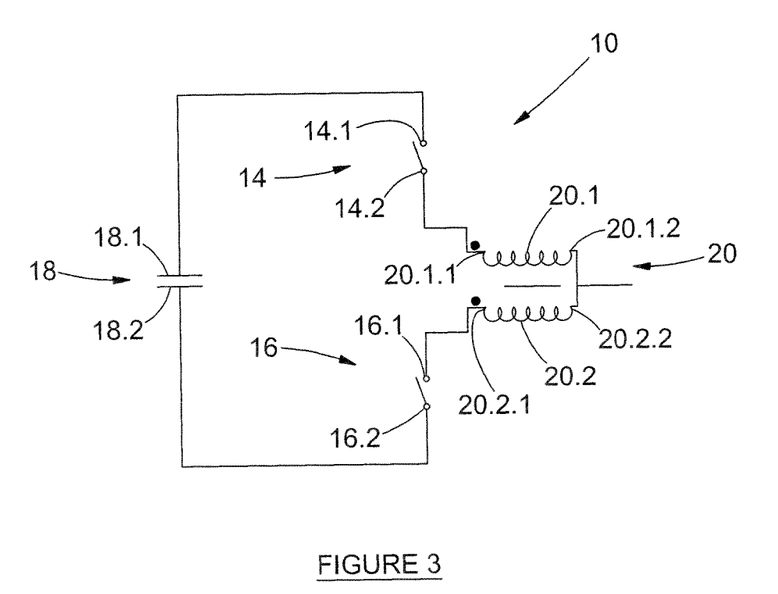
FIG. 3 is a basic circuit diagram of an example embodiment of an output stage of a switched mode drive circuit.

In FIG. 3, a first example embodiment of an output stage of a drive circuit according to the invention is generally designated by the reference numeral 10. The output stage 10 comprises a first switch 14 comprising a first terminal 14.1 and a second terminal 14.2, a second switch 16 comprising a first terminal 16.1 and a second terminal 16.2 and an inductive component 20 comprising at least a first winding part 20.1 having a first end 20.1.1 and a second end 20.1.2 and a second winding part 20.2 having a first end 20.2.1 and a second end 20.2.2. The stage 10 further comprises an energy storage device 18 having a first pole 18.1 and a second pole 18.2. The first and second terminals of each of the first switch 14 and second switch 16 and the first and second ends of each of the first winding part 20.1 and second winding part 20.2 are connected in series between the first pole 18.1 and the second pole 18.2 of the energy storage device 18. The first winding part 20.1 and second winding part 20.2 are configured in a common mode, as illustrated by the dot convention in FIG. 3. In other embodiments, the first and second winding parts may be configured in a differential mode as will be explained below.

Figure 4:
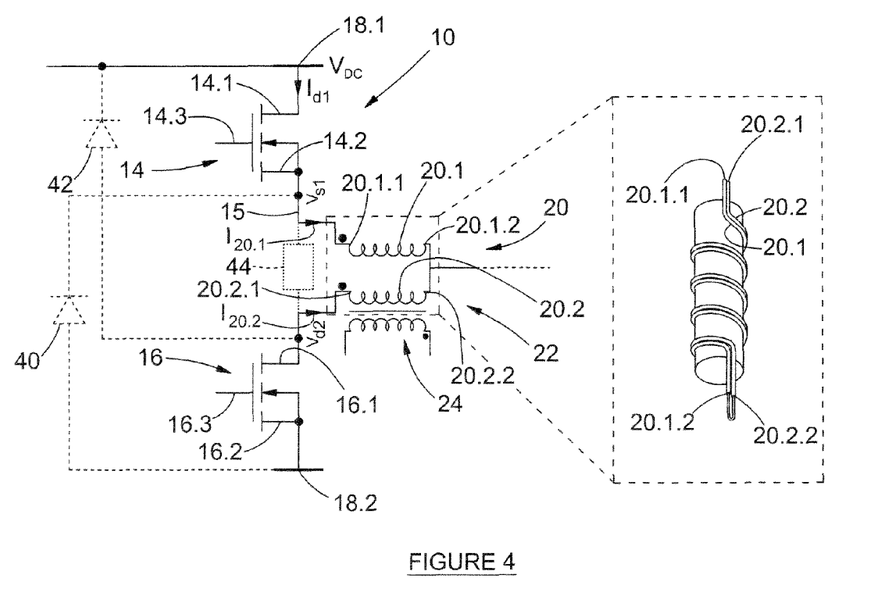
FIG. 4 is a more detailed diagram of an example embodiment of a push-pull configuration output stage of a switched mode drive circuit.

In FIG. 4 a more detailed example embodiment of a push-pull configuration of the output stage is shown. The first switch 14 comprises a first insulated gate semiconductor device comprising a first terminal or drain 14.1, a second terminal or source 14.2 and a third terminal or gate 14.3. The second switch 16 comprises a second insulated gate semiconductor device comprising a first terminal or drain 16.1, a second terminal or source 16.2 and a third terminal or gate 16.3. The drain 14.1 of the first device 14 is connected to the first pole 18.1 of DC power supply 18. The source 16.2 of the second device 16 is connected to the other pole 18.2 of the DC power supply. Further, the source 14.2 of the first device 14 is connected to the first end 20.1.1 of the first winding part 20.1 of the inductive component to be driven in the form of a primary winding 20 of transformer 22. The transformer 22 comprises a secondary winding 24. The drain 16.2 of the second device 16 is connected to the first end 20.2.1 of the second winding part 20.2 of the primary winding 20. The second end 20.1.2 of the first winding part 20.1 and the second end 20.2.2. of the second winding part 20.2 are connected to one another and the first winding part 20.1 and second winding part 20.2 are configured in a common mode, as illustrated by the dot convention in FIG. 4. The common mode configuration may comprise any one of a bifilar winding as illustrated in the enlarged part of FIG. 4 and in FIG. 13(*a*), alternatively in a hybrid configuration as shown in FIG. 13(*b*), further alternatively in a co-wound configuration as shown in FIG. 13(*c*) and still further alternatively, in an at least partial bifilar configuration as shown in FIG. 13(*d*). The stage 10 may further comprise at least one damping component and preferably both of damping components in the form of diodes 40 and 42. A dissipative component 44 may be provided between the respective first ends of the first and second winding parts. The component 44 may for example comprise a resistive component.

Referring again to FIGS. 13(*a*) to (*c*), the coupling between the two winding parts 20.1 and 20.2 decreases from FIG. 13(*a*) to FIG. 13(*c*) resulting in an increase in the shorted circuit protection inductance. In FIG. 13(*a*) there is shown a bifilar configuration, in FIG. 13(*c*) there is shown a co-wound configuration wherein the first and second winding parts are located next to one another or in juxtaposition on the core and in FIG. 13(*b*) there is shown a hybrid between the aforementioned bifilar configuration and the aforementioned co-wound configuration. In FIG. 13(*d*) the protection inductance is less than in FIG. 13(*a*), because only a part of the primary winding is bifilar. It will be appreciated that corresponding partial configurations are also possible with the co-wound and hybrid configurations. All these configurations make it possible to design the primary winding parts for a specific amount of protection impedance.

Figure 5A:
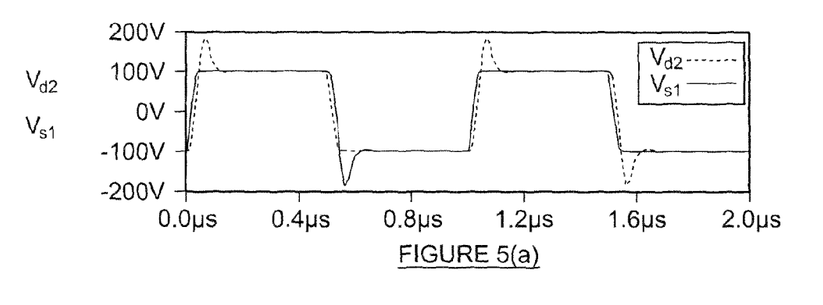
Figure 5B:
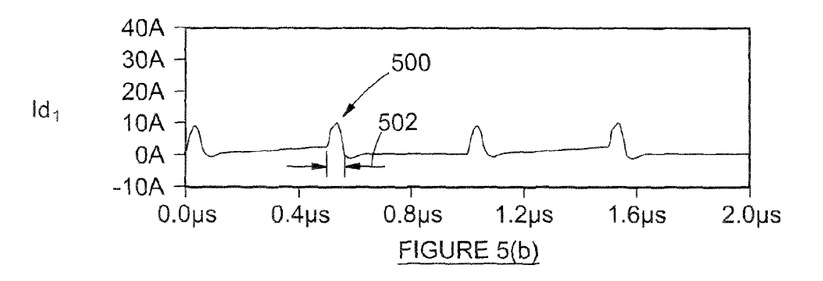
Figure 5C:
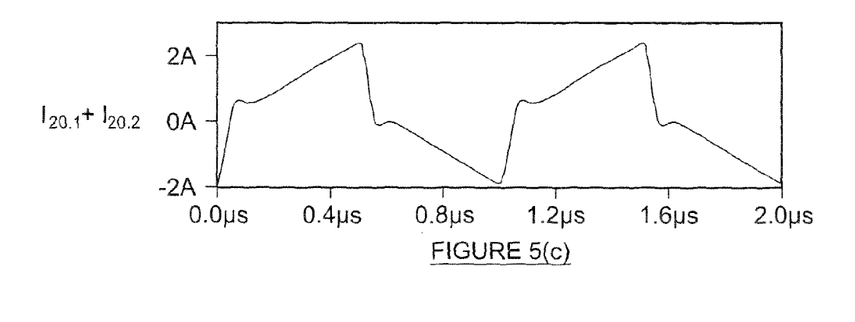

In FIG. 5, oscillograms against time of signals at selected points in FIG. 4 are shown. FIG. 5(*a*) depicts the voltages at points 14.2 and 16.1, the former in solid lines and the latter in broken lines. FIG. 5(*b*) shows the current in the output circuit 15 and through the devices 14 and 16. FIG. 5(*c*) shows the sum of the currents through the first part 20.1 and the second part 20.2 of the primary winding 20 of the transformer 22.

Comparing FIGS. 2(*a*) and 2(*c*) to FIGS. 5(*a*) and 5(*c*), it can be seen that the performance of the output stage 10 is similar to the performance of the output stage 100 when only one of the switches is on at a time. That is, the performance of the aforementioned primary circuit is similar.

However, as is clear from FIG. 5(*b*) and more particularly at 500, the current in the output circuit 15 through the devices 14 and 16 while both are on during periods 502, is reduced to below 10A. Hence, the aforementioned first and second parts of the inductive component form a current limiting protection impedance in the shorted circuit, to protect the devices 14 and 16. Even though the bifilar winding has very good coupling between the first and second winding parts, the coupling is never perfect, which adds inductance to the shorted circuit. The lengths of the windings also add some transmission line delay effects and some resistance. All these effects contribute to limit the current in the shorted circuit. More particularly, bifilar windings have a magnetic coupling coefficient between the two windings of better than 0.99, so that the shorted circuit inductance is less than about 1% of the primary circuit inductance. The coupling of the shorted circuit inductance and the magnetic material is also negligible, resulting in the inductance added to the shorted circuit being frequency independent. This alleviates the aforementioned frequency dependence problem of the conventional series protection inductor. The length of the wire used in the bifilar winding is also longer than that of the conventional series component. This longer wire results in transmission line delay effects which damp high frequency signals in the shorted circuit better than the conventional component. The transmission line damping may also be used to suppress certain unwanted high frequency ringing.

Figure 6:
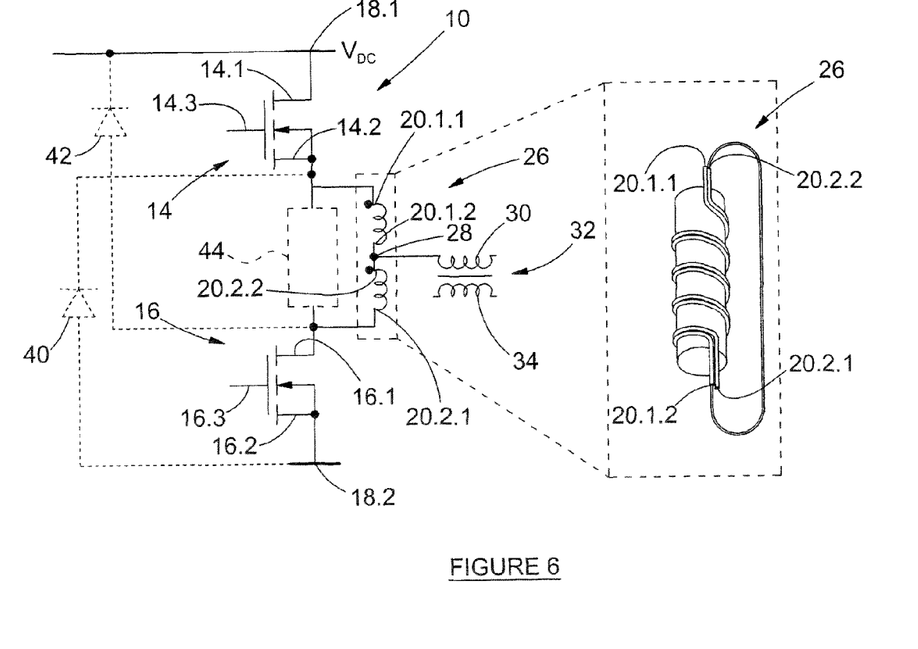
FIG. 6 is a circuit diagram of another example embodiment of a push-pull configuration output stage of a switched mode drive circuit.

In the example embodiment in FIG. 6, the source 14.2 of the first device 14 and the drain 16.1 of the second device 16 are connected to one another via a separate protection inductive component or winding 26 having an intermediate tap point 28. The second end 20.1.2 of the first winding part 20.1 and the second end 20.2.2. of the second winding part 20.2 are connected to one another and the first winding part 20.1 and second winding part 20.2 are configured in a differential mode, as illustrated by the dot convention in FIG. 6. The differential mode configuration may comprise any one of a bifilar winding as illustrated in the enlarged part of FIG. 6 and in FIG. 13(*a*), alternatively in a hybrid configuration as shown in FIG. 13(*b*) and further alternatively in a co-wound configuration as shown in FIG. 13(*c*). The tap point 28 is connected to the inductive component to be driven, in the form of the primary winding 30 of transformer 32. The transformer also has a secondary winding 34. In this embodiment, the winding 26 forms the current limiting protection impedance in the shorted circuit, to protect the devices 14 and 16. The protection winding 26 will add inductance to the primary circuit, but it is believed that it will add about four times as much inductance to the shorted circuit. It is further believed that by using a protection winding 26 with an inductance much smaller than the inductance of the primary winding 30 (typically less than 1% of the inductance of the primary winding) the inductance of the protection winding 26 will have a small effect on the primary circuit, whilst still protecting the switches in the shorted circuit.

Also in this example embodiment, one or both of the damping components 40 and 42 of FIG. 4 may be added as well as the dissipative component 44.

Figure 7:
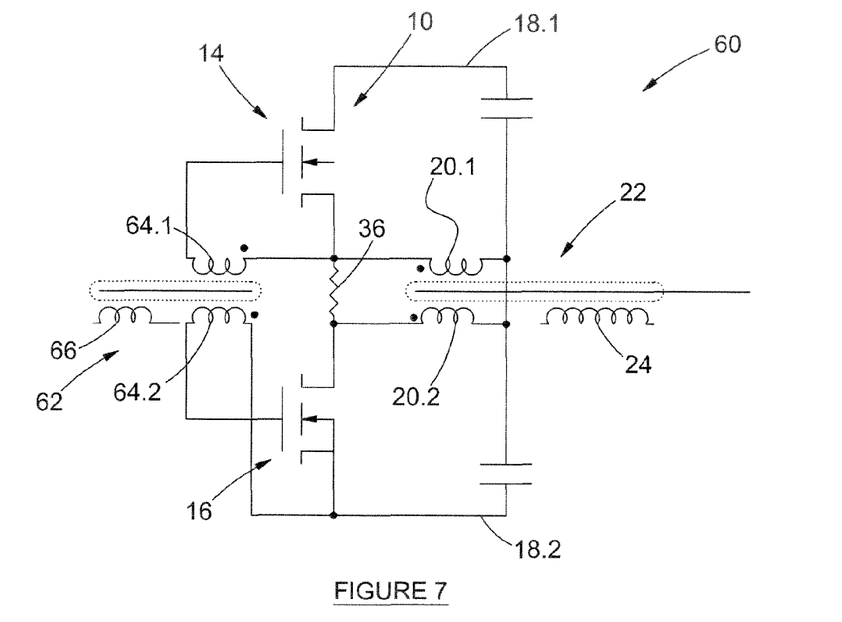
FIG. 7 is a circuit diagram of an example embodiment of a switched mode drive circuit comprising a push-pull configuration output stage.

In FIG. 7 and designated 60, there is shown an example embodiment of a drive circuit comprising the output stage 10 of FIG. 4. In the circuit 60, the devices 14 and 16 are driven in push-pull mode by an external drive circuit using a gate drive transformer 62 having bifilar secondary windings 64.1 and 64.2, and a primary winding 66. In one embodiment, the devices 14 and 16 may be driven at a resonant frequency of a circuit comprising the secondary winding 24 of the transformer 22, which secondary winding 24 may be weakly coupled to the first and second parts 20.1 and 20.2 of the primary winding 20.

Figure 8:
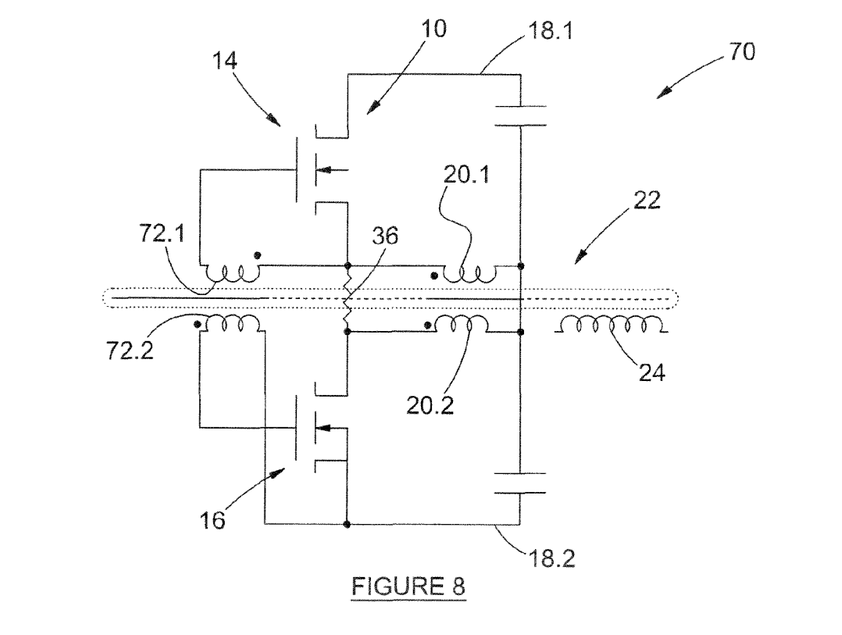
FIG. 8 is a circuit diagram of another example embodiment of a switched mode drive circuit comprising a push-pull configuration output stage.

In FIG. 8 and designated 70, there is shown another example embodiment of a drive circuit comprising the output stage 10 of FIG. 4.

The circuit 70 is made self-oscillating by weakly coupling the gate drive windings 72.1 and 72.2 with the first and second parts 20.1 and 20.2 of the primary winding or the secondary winding 24 of the transformer 22. For optimum performance, the correct phase difference between the voltage signals applied to the gates of the transistors 14 and 16 and the current in the transformer 22 has to be used. This correct phase may be achieved in a number of ways, for example by suitably selecting the coupling between the gate windings and the primary winding parts and the orientation between the gate windings and the primary winding parts.

Figure 9:
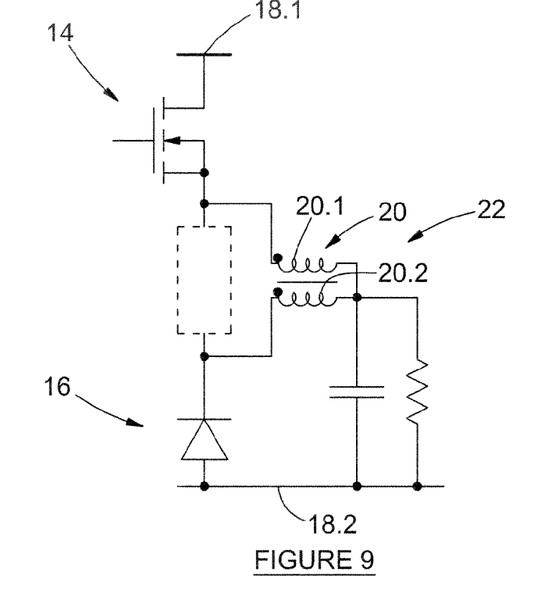
FIG. 9 is a circuit diagram of an example embodiment of a buck configuration output stage of a switched mode drive circuit.
Figure 10:
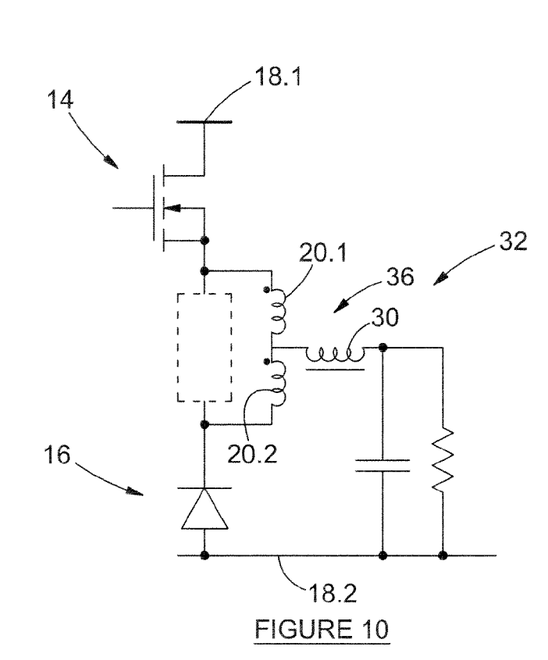
FIG. 10 is a circuit diagram of another example embodiment of a buck configuration output stage of a switched mode drive circuit.

In FIG. 9 there is shown an example embodiment of an output stage similar to the one in FIG. 4, but in a buck configuration wherein the second switch device comprises a diode and the inductive component 20 may or may not form part of a transformer. In FIG. 10 there is shown an example embodiment of an output stage similar to the one in FIG. 6, but in a buck configuration wherein the second switching device comprises a diode 16 and the inductive component 30 may or may not form part of a transformer.

Figure 11:
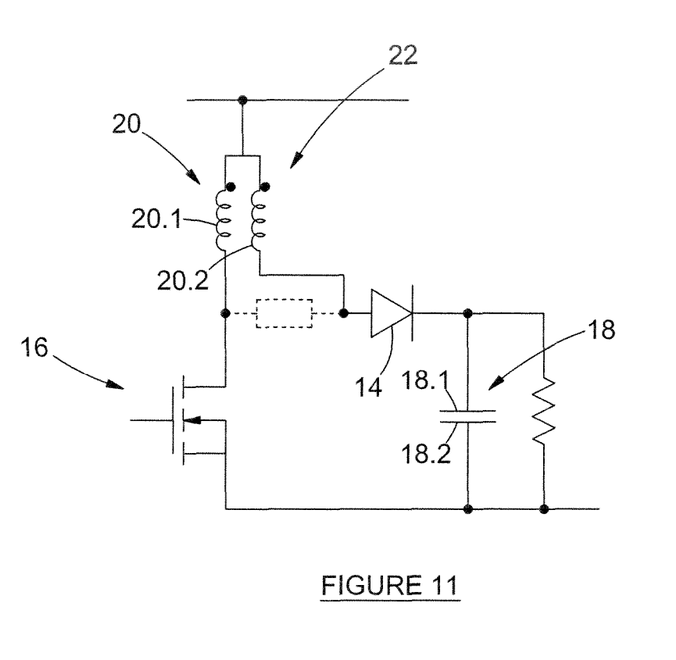
FIG. 11 is a circuit diagram of an example embodiment of a boost configuration output stage of a switched mode drive circuit.
Figure 12:
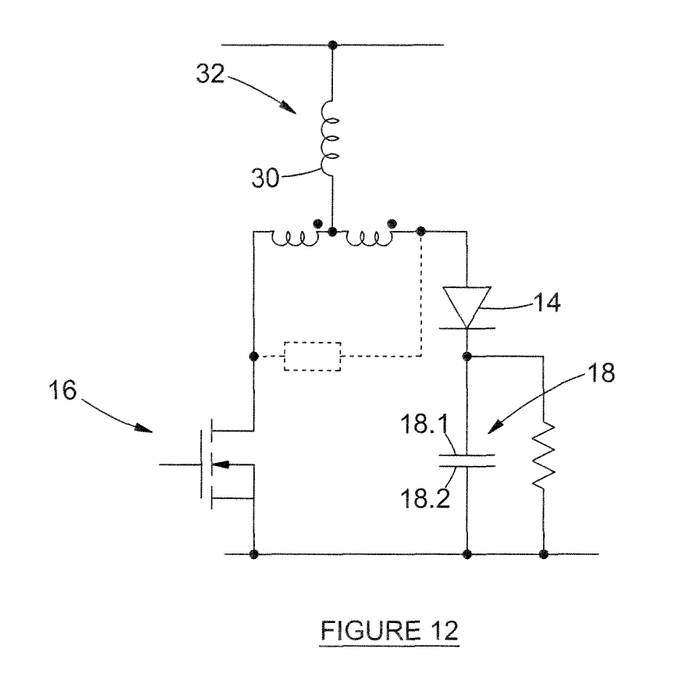
FIG. 12 is a circuit diagram of another example embodiment of a boost configuration output stage of a switched mode drive circuit.
Figure 13A:
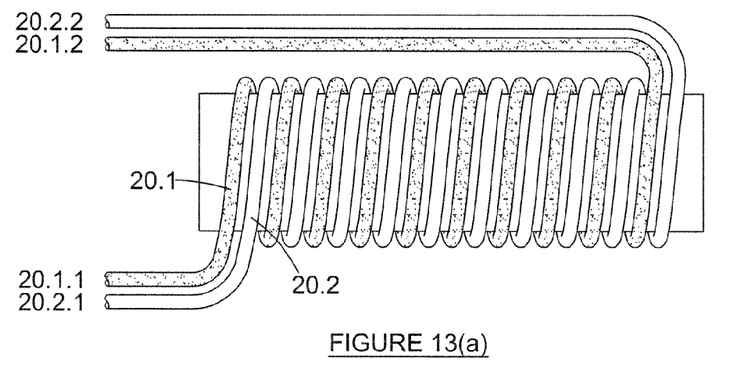
Figure 13B:
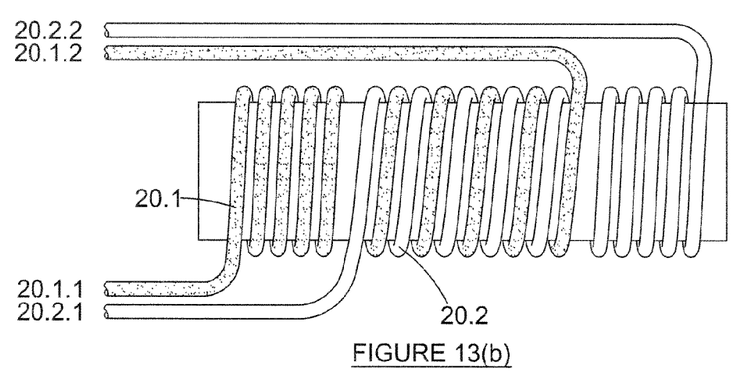
Figure 13C:
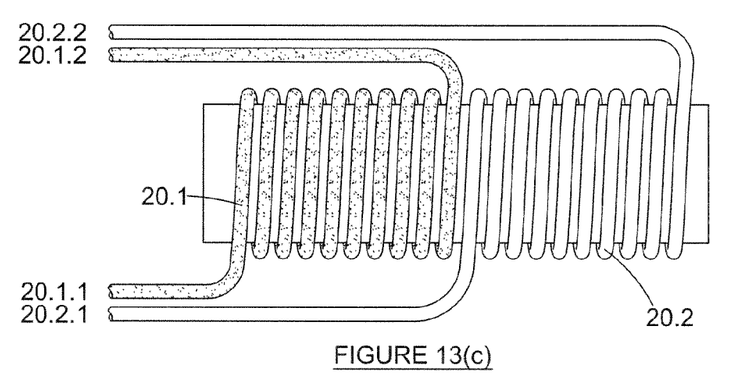
Figure 13D:
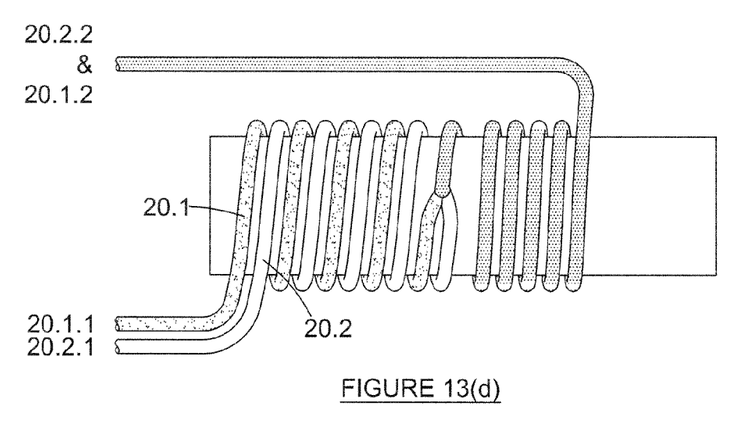

In FIG. 11 there is shown an example embodiment of an output stage similar to the one in FIG. 4, but in a boost configuration wherein the first switch device comprises a diode 14, the energy storage device comprises capacitor 18 and the inductive component 20 may or may not form part of a transformer. In FIG. 12 there is shown an example embodiment of an output stage similar to the one in FIG. 6, but in a boost configuration wherein the first switch device comprises a diode 14, the energy storage device comprises capacitor 18 and the inductive component 30 may or may not form part of a transformer.

The invention claimed is:

1. A switched mode drive circuit comprising:
a first switch comprising a first terminal and a second terminal;
a second switch comprising a first terminal and a second terminal;
an inductive component comprising at least a first winding part having a first end and a second end and a second winding part having a first end and a second end and wherein the second winding part is connected in series with the first winding part;
an energy storage device having a first pole and a second pole;
an output circuit comprising a serial connection of the first switch, the second switch, the first winding part and the second winding part connected to the first and second poles of the energy storage device; and wherein the first and second winding parts are configured in common mode; and
a drive means for causing the first switch and second switch to switch in alternate switched mode, so that during a first switching transition, the first switch switches from on to off and the second switch switches from off to on and during a next switching transition, the first switch switches from off to on and the second switch switches from on to off, wherein during at least part of some of the switching transitions both switches are on at the same time; and wherein the serially connected first and second winding parts form a protective current limiting impedance to reduce current through the first and second switches when the first and second switches are on at the same time.

2. A switched mode drive circuit as claimed in claim 1 wherein the first end of the first winding part is connected to the second terminal of the first switch, the second end of the first winding part is directly connected to the second end of the second winding part and wherein the first end of the second winding part is connected to the first terminal of the second switch.

3. A switched mode drive circuit as claimed in claim 1 wherein the first winding part and second winding part are at least partially arranged in bifilar configuration.

4. A switched mode drive circuit as claimed in claim 1 wherein at least one of the first switch and the second switch comprises a switching transistor.

5. A switched mode drive circuit as claimed in claim 4 wherein each of the first switch and the second switch comprises a switching transistor.

6. A switched mode drive circuit as claimed in claim 1 wherein at least one of the first switch and the second switch comprises a diode.

7. A switched mode drive circuit as claimed in claim 1 wherein the first terminal switch is connected to the first pole of the energy storage device and the second pole of the second switch is connected to the second pole of the energy storage device.

8. A switched mode drive circuit as claimed in claim 1 wherein the energy storage device comprises a DC power supply.

9. A switched mode drive circuit as claimed in claim 1 wherein the energy storage device comprises a capacitor.

10. A switched mode drive circuit as claimed in claim 1 wherein an impedance component is provided between the second terminal of the first switch and the first terminal of the second switch in parallel with the first winding part and the second winding part.

11. A switched mode drive circuit as claimed in claim 1 wherein a damping component is provided between at least one of a) the first pole of the energy storage device and the first terminal of the second switch and b) the second pole of the energy storage device and the second terminal of the first switch.

12. A switched mode drive circuit as claimed in claim 1 wherein the inductive component comprises a primary winding of a transformer.

13. A method of driving a switched mode drive circuit which comprises a first switch comprising a first terminal and a second terminal; a second switch comprising a first terminal and a second terminal; an inductive component comprising at least a first winding part having a first end and a second end and a second winding part having a first end and a second end and wherein the second winding part is connected in series with the first winding part; an energy storage device having a first pole and a second pole; and an output circuit comprising a serial connection of the first switch, the second switch, the first winding part and the second winding part connected to the first and second poles of the energy storage device and wherein the first and second winding parts are configured in common mode; the method comprising:
causing the first switch and second switch to switch in alternate switched mode, so that during a first switching transition, the first switch switches from on to off and the second switch switches from off to on and during a next switching transition, the first switch switches from off to on and the second switch switches from on to off, wherein during at least part of some of the switching transitions both switches are on at the same time; and
utilizing the serially connected first and second winding parts to form a protective current limiting impedance to reduce current through the first and second switches when the first and second switches are on at the same time.

14. A switched mode drive circuit as claimed in claim 1, wherein the first and second winding parts form part of a transformer which also comprises a secondary winding.

15. A switched mode drive circuit as claimed in claim 1, wherein during at least part of some of the switching transitions both switches are on at the same time for a short period.

16. A method of driving a switched mode driver circuit as claim in claim 13, wherein during at least part of some of the switching transitions both switches are on at the same time for a short period.

* * * * *